Oct. 19, 1954    J. W. DICKEY ET AL    2,691,891
MECHANICAL TYPE THERMOMETER
Filed Dec. 11, 1951    2 Sheets-Sheet 1

WITNESS:
Esther M. Stockton

INVENTORS
John W. Dickey
E. Elliott Hood
BY
Clinton L. James
ATTORNEY

Oct. 19, 1954 J. W. DICKEY ET AL 2,691,891
MECHANICAL TYPE THERMOMETER
Filed Dec. 11, 1951 2 Sheets-Sheet 2
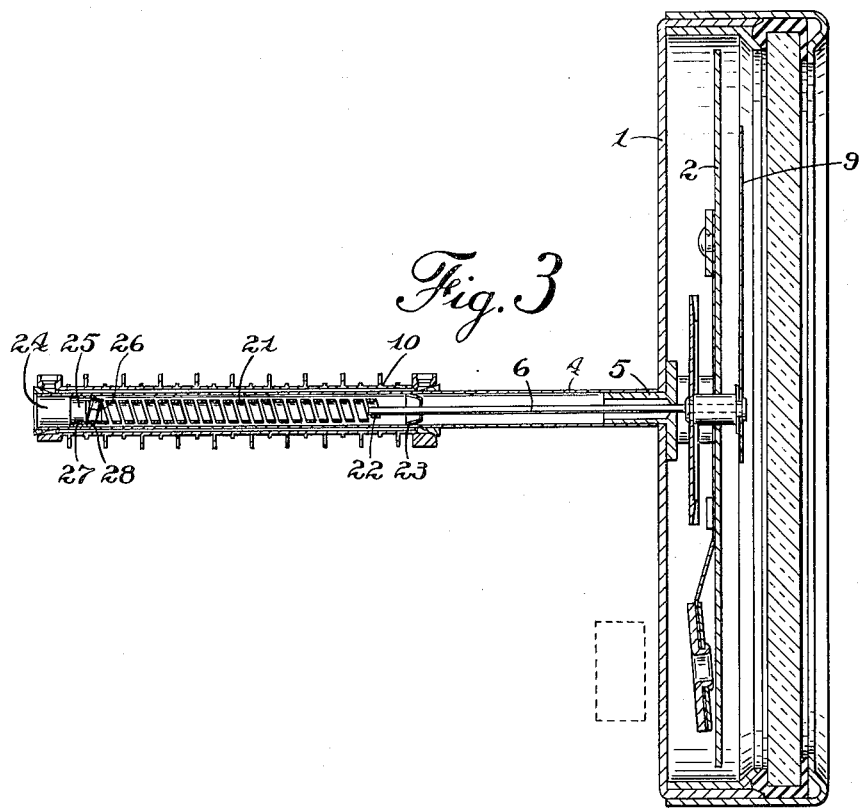
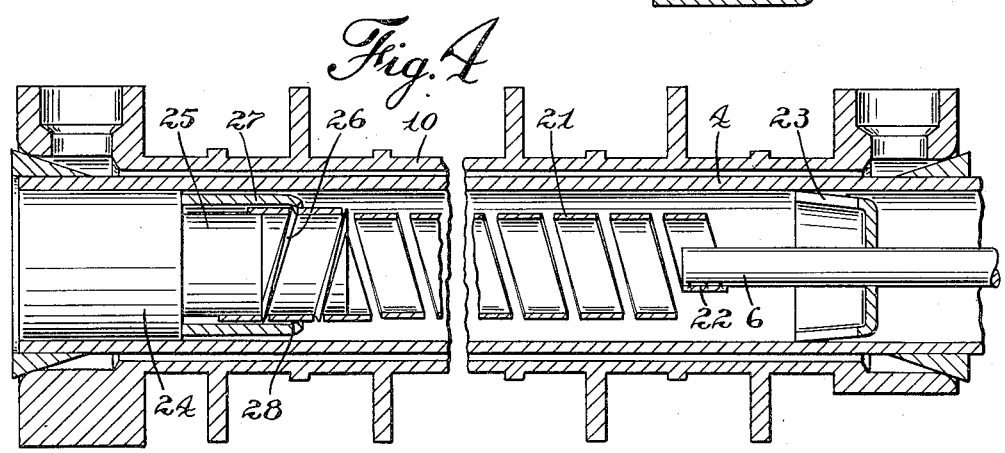
WITNESS:
Esther M. Stockton
INVENTORS
John W. Dickey
E. Elliott Hood
BY
Clinton S. Janes
ATTORNEY Patented Oct. 19, 1954

2,691,891

UNITED STATES PATENT OFFICE 2,691,891

MECHANICAL TYPE THERMOMETER

John W. Dickey, Newfield, and E. Elliott Hood, Elmira, N. Y., assignors to Bendix Aviation Corporation, a corporation of Delaware Application December 11, 1951, Serial No. 261,092

4 Claims. (Cl. 73—367)

The present invention relates to a mechanical type thermometer, and more particularly to a thermometer in which the heat-responsive element is in the form of a tubular spiral of bi-metallic material.

The thermometer here disclosed is intended primarily for use in situations where it is subject to rapid fluctuations of temperature over a very wide range, as encountered in apparatus for determining the freezing point of liquids, such as disclosed in the co-pending application of Dickey, Serial No. 83,986, filed March 28, 1949, now U. S. Patent No. 2,633,736, and assigned to the assignee of the present application.

It is an object of the present invention to provide a thermometer of the above type in which the heat-sensitive element is located in a stem remote from the registering part of the thermometer, and incorporating novel means for reducing the transmission of heat from the body of the thermometer to the heat-sensitive element.

It is another object to provide such a device having novel means for anchorage of the heat-sensitive element in the thermometer stem, and for calibrating and adjusting the thermometer.

Further objects and advantages will be apparent from the following description taken in connection with the accompanying drawing in which:

Fig. 3 is a view similar to Fig. 1 showing an embodiment of the invention in which the calibrating adjustment of the heat sensitive element is effected at the anchored end of the element; and Fig. 4 is an enlarged sectional detail of the anchoring and connecting means shown in Fig. 3.

Figure 1:
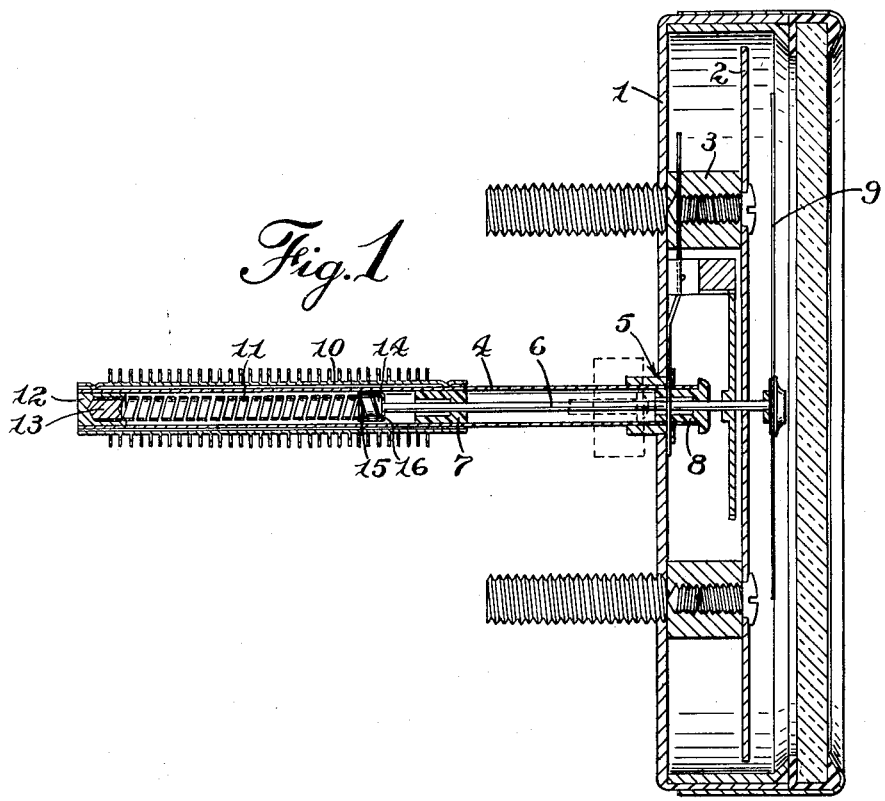
Fig. 1 is a vertical substantially mid-sectional view of a preferred embodiment of the invention.

In Fig. 1 of the drawing there is illustrated a generally cylindrical casing 1 in which a circular dial 2 is fixedly mounted in any suitable manner, as indicated at 3. A hollow stem 4 is rigidly mounted on the casing 1 substantially normal thereto and co-axial therewith as indicated at 5, and a needle staff 6 is freely journalled in the stem by means of bearings 7 and 8, and has an indicating needle 9 fixedly mounted on one end thereof within the casing 1 in operative relation with the dial 2. The thermometer stem is enclosed in a flanged heat-exchange tube 10 which provides an annular space around the stem for receiving the liquid whose freezing point is to be determined as set forth in the Dickey application above cited.

A heat-sensitive element 11 in the form of a tubular spiral of bi-metallic ribbon having spaced convolutions is located in the thermometer stem 4, rigidly connected at one end to the free end of the stem, and coupled at its other end to the needle staff 6.

Figure 2:
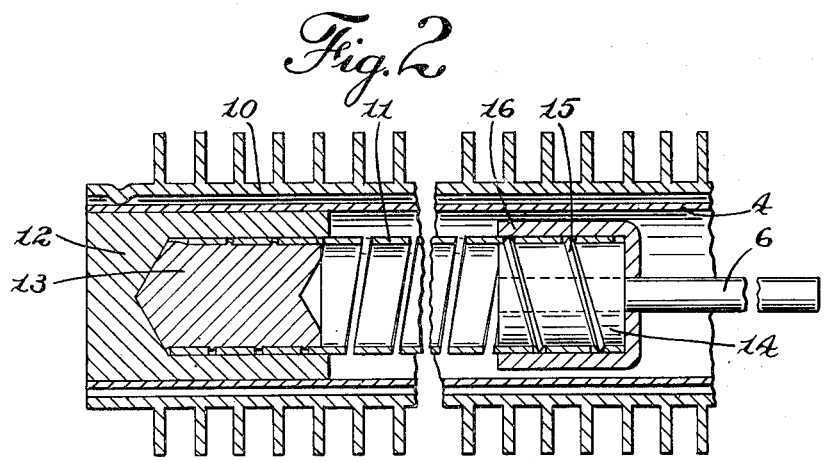
Fig. 2 is a sectional detail on an enlarged scale showing the anchoring and connecting means for the temperature-sensitive element.

The connection between the heat-sensitive element 11 and the stem 4 is effected as shown in Fig. 2 by means of a metallic cup member 12, soldered in the end of the stem, snugly receiving the end of the spiral 11 and rigidly connected therewith by means of a slug 13 of comparatively soft material such as copper which is expanded laterally by end-wise pressure so as to force the spiral outward into a firm anchored relation with the cup.

The connection between the bi-metallic spiral 11 and the needle staff 6 is so constructed as to provide for convenient and accurate calibration of the heat-sensitive element, and for permanent retention of the calibration. For this purpose, the end of the needle staff 6 has a screw member 14 rigidly mounted thereon in any suitable manner as by soldering, which screw member has a thread 15 having the same pitch as the spiral 11 and slideably engaging between the spaced convolutions of the spiral. Rotation of the needle stem and screw member with respect to the heat-sensitive element therefore moves the screw member longitudinally so as to vary the effective length of the heat-sensitive element, and consequently vary the ratio between change of temperature and the angular movement of the needle caused thereby. In order to immobilize this connection after adjustment has been secured, a cup member 16 is mounted on the end of the needle staff 6 so as to overlap the screw member 14 and the end of the bi-metallic spiral, and relative rotation of the parts is prevented by staking the parts together by displacing one or more portions of the cup 16 inwardly. The thread 15 of screw member 14 is preferably formed with a sharp edge or crown as illustrated so that when the cup 16 is pressed inward, the thread cuts into the interior of the cup so as to form a permanent rigid connection.

In the assembly of the instrument, one end of the heat sensitive element 11 is first introduced into the cup 12, the slug 13 is dropped in place and then expanded by a blow or pressure exerted through a suitable mandrel inserted in the bi-metallic element, so as to form a rigid swaged connection. The needle staff 6, with the screw member 14 soldered thereon, is then threaded into the free end of the bi-metallic spiral and is adjusted so as to secure the desired relationship between temperature change of the heat-sensitive element and consequent rotation of the needle staff 6. A suitable relation for the use of this thermometer in a freezemeter as disclosed in the Dickey application cited has been found to be one degree of angular deflection of the needle staff for each change of one degree Fahrenheit in temperature. When this adjustment has been secured, the cup 16 is deflected inwardly at one or more points to stake the parts permanently together. The assembly is then slid into the thermometer stem 4, the needle 9 is mounted on the stem 6 and the assembly is rotated into position to properly indicate the existing temperature on the dial 2. The cup 12 is then permanently connected to the free end of the stem 4 as by soldering.

It will be particularly noted that since, when the thermometer is in use, the stem 4 is in contact with the fluid whose temperature is to be measured, and since the heat-sensitive element 11 is only connected to the stem at its outer end, there will be no transmission of heat between the body of the casing 1 of the thermometer and the heat sensitive element through the stem 4, as would be the case if the heat-sensitive element were connected to the stem at its other end. Transmission of heat to or from the heat-sensitive element through the needle staff 6 is minimized by making the bearings 7 and 8 of insulating material, and the staff itself is preferably made of a material such as a stainless steel having a comparatively high resistance to the conduction of heat. By this arrangement, the heat-sensitive element faithfully follows the changes in temperature of the adjacent portion of the thermometer stem 4 without the introduction of errors due to heat conduction from the body of the thermometer.

In Figs. 3 and 4 of the drawing there is illustrated a second embodiment of the invention incorporating modifications in the means for anchoring the temperature-sensitive element and for coupling it to the needle staff of the thermometer.

In this embodiment, the parts of the indicating portion of the thermometer including the casing, dial, needle, stem and needle staff are the same as in the first embodiment and are similarly numbered.

In this case, however, the heat-sensitive element 21 is spot-welded to the needle staff 6 as indicated at 22 at the end adjacent to the body of the thermometer, this end being maintained in coaxial relation with the stem 4 of the thermometer by means of a cup-shaped bearing 23 having a slightly elastic rim, which is pressed into the stem 4 when the device is assembled.

The opposite end of the heat sensitive element 21 is mounted on a plug member 24 having a reduced extension 25 provided with a thread 26 slidably engaging between the convolutions of the heat-sensitive element.

Means are provided for anchoring the heat sensitive element in adjusted position on the plug 24, such means being here illustrated in the form of a sleeve 27 of somewhat smaller diameter than the main portion of the plug 24 and having a sliding fit over the end of the heat-sensitive element. The anchorage of these members is secured by pressing the sleeve 27 inwardly at one or more locations as indicated at 28 so as to form a rigid connection between the heat-sensitive element and the plug. Alternatively, the heat-sensitive element 21 may be anchored in the plug 24 by spot-welding in its adjusted position.

In the assembly of this embodiment of the invention, the needle staff 6 is welded to the free end of the heat sensitive element 21; the sleeve 27 is slid on the other end of the bi-metallic spiral and the latter is threaded on the plug 24. The subassembly is then mounted in a calibrating fixture and the spiral is adjusted on the plug until its effective length is such as to secure the desired relationship between the angular rotation of the needle staff and the change of temperature corresponding thereto. When this adjustment is secured, the sleeve 27 is staked to the spiral 21 and the plug as indicated at 28, or the bimetal is spot-welded to the plug, and the assembly is inserted in the stem 4 of the thermometer. The plug 24 is then permanently connected to the end of the stem in any suitable manner as by soldering. The needle 9, which is preferably frictionally mounted on the free end of the staff 6 similarly to the conventional manner of mounting the hands of a clock, is then adjusted on its staff so as to indicate the prevailing temperature on the scale 2.

Although certain embodiments of the invention have been shown and described in detail, it will be understood that other embodiments are possible and changes may be made in the precise form and arrangement of the parts without departing from the spirit of the invention.

We claim:

1. In a mechanical type thermometer a casing, an arcuate dial fixedly mounted in the casing; a tubular stem mounted on the casing normal to and coaxial with the dial, a staff rotatably mounted in the stem projecting into the casing and having a needle fixed thereon in cooperative relation to the dial, a spiral of bimetallic ribbon in the stem, and means for anchoring one end of the spiral to the outer end of said stem, and the other end of the spiral to the outer end of the needle staff; the spiral of bimetallic ribbon being formed with uniformly spaced convolutions, and means for adjusting the free length of the spiral between said anchorages to vary the ratio between temperature change of the spiral and consequent angular movement of the needle comprising an anchoring plug in one end of the spiral having a thread of the same pitch as said spiral and slidable in the spaces between the convolutions, and means including a sleeve surrounding and compressing the bimetallic spiral for immobilizing the threaded connection between the plug and bimetallic spiral in adjusted position.

2. In a mechanical type thermometer, a casing, a hollow cylindrical stem fixed at one end to the casing and extending substantially normal thereto, a tubular spiral of bi-metallic ribbon in said stem having spaced convolutions, a cup member fixedly mounted on one end of the bi-metallic spiral, means anchoring said cup in the other end of said stem, a needle staff rotatably mounted in the stem and extending into the casing, a threaded connection between the staff and the other end of the bi-metallic spiral, and means for immobilizing the threaded connection; in which the threaded connection between the needle staff and the bi-metallic spiral comprises an adjusting screw member fixedly mounted on said staff having a thread slidably engaging the spaced convolutions of the spiral and a cup fitting over the end of the spiral, overlapping the screw member and having a portion displaced inwardly to hold the connection in adjusted position.

3. A thermometer as set forth in claim 2 in which the thread of the adjusting nut has a sharp crown which cuts into the interior of the cup where the cup is displaced inwardly.

4. A mechanical type thermometer including a rotatable needle staff, means including a spiral of bi-metallic ribbon for rotating the staff in response to changes of temperature, and means for adjusting the effective length of the spiral including a mounting and connecting element threaded into one end of the spiral and a deformable sleeve surrounding and compressing the threaded connection for immobilizing it in adjusted position.

References Cited in the file of this patent

UNITED STATES PATENTS

| Number | Name | Date |
|---|---|---|
| 329,237 | St. John | Oct. 27, 1885 |
| 362,957 | Haight | May 17, 1887 |
| 442,879 | Haight | Dec. 16, 1890 |
| 1,332,116 | Ewing | Feb. 24, 1920 |
| 2,243,733 | Ford | May 27, 1941 |

FOREIGN PATENTS

| Number | Country | Date |
|---|---|---|
| 508,441 | Great Britain | June 30, 1939 |
| 560,362 | Great Britain | Mar. 31, 1944 |